April 29, 1941.  H. GALE  2,240,013
WINDSHIELD DEFROSTER
Filed April 1, 1940
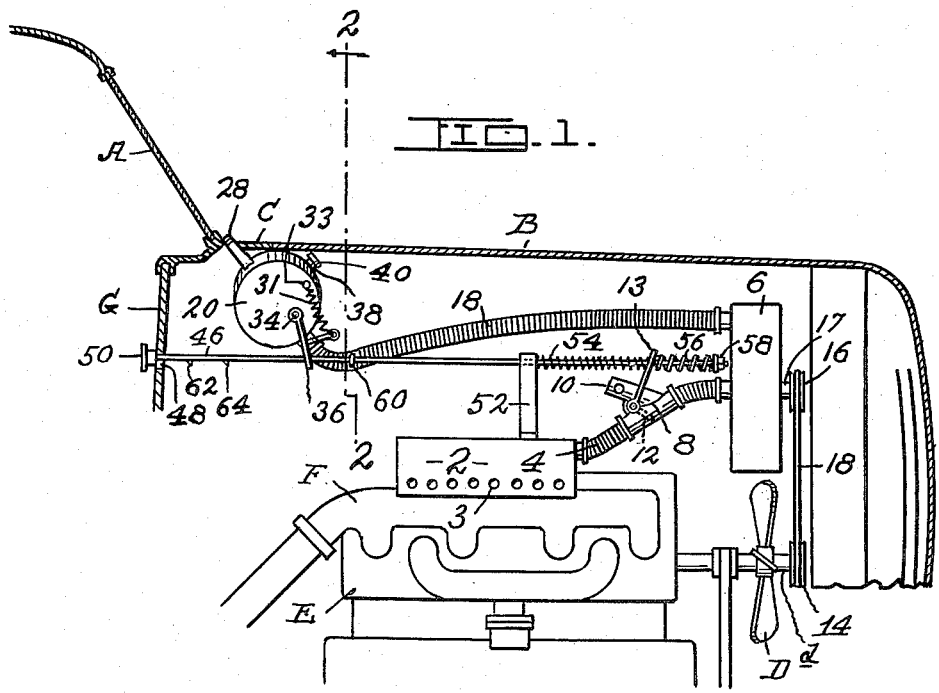
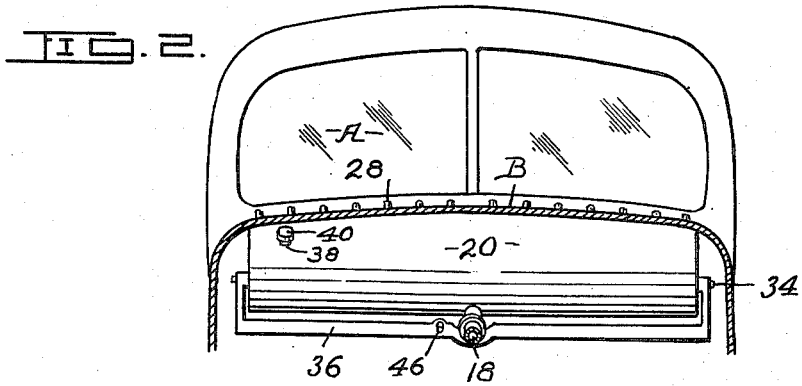
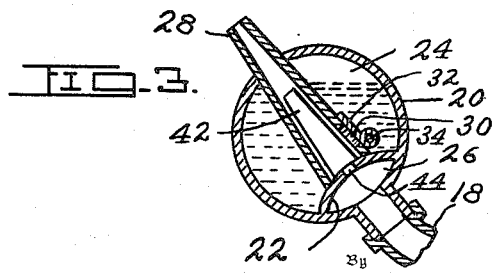
Inventor:
Herbert Gale,
F. G. Fischer,
Attorney.

Patented Apr. 29, 1941

2,240,013

UNITED STATES PATENT OFFICE 2,240,013

WINDSHIELD DEFROSTER

Herbert Gale, Kansas City, Mo., assignor of one-half to Jack W. Comer, Kansas City, Mo.

Application April 1, 1940, Serial No. 327,194

3 Claims. (Cl. 20—40.5)

My invention relates to defrosting apparatus for automobile windshields and my object is to provide means for discharging hot air against the windshield to prevent snow and ice from accumulating thereon and obstructing the driver's vision when the automobile is in motion.

A further object is to provide apparatus of this character whereby an antifreeze and rain shedding liquid may be sprayed on the windshield by the hot air in the event that ice and snow should accumulate on the windshield while the car is standing still.

The apparatus is so arranged that the hot air only may be used, or when desired both the hot air and the antifreeze liquid may be used simultaneously.

Other features will hereinafter appear and in order that the invention may be fully understood reference will now be had to the accompanying drawing, in which:

Fig. 1 is a vertical longitudinal section of a portion of a motor vehicle equipped with my defrosting apparatus.

Fig. 2 is a vertical cross section on line 2—2 of Fig. 1.

Fig. 3 is an enlarged cross section of a tank for holding the antifreeze liquid and means for syphoning the liquid from said tank and spraying it upon the windshield.

Referring in detail to the different parts, A designates the windshield of an automobile, B the hood, C the cowl, D the fan, E the engine and F the engine exhaust manifold which is equipped with a stove or a hot air heater 2 having air inlets 3 and an outlet pipe 4 leading to the intake of a blower 6. The outlet pipe 4 is provided with a Y-coupling 8 having a cold air intake 10 and a valve 12, which latter is adapted to be adjusted with a lever 13 to one position to close the cold air intake 10, or to another position to cut off the hot air to the blower 6 and admit cold air through the intake 10. The blower 6 is driven by suitable means such as pulleys 14 and 16 and a belt 18. The pulley 14 is fixed to the fan shaft $d$ and the pulley 16 is fixed to the shaft 17 of the blower 6.

The blower 6 forces the air through an outlet pipe 18 leading back to a tank 20 placed beneath the hood B and the cowl C. The tank 20 is divided by means of a longitudinal partition 22 into a liquid holding compartment 24 and an air compartment 26, to which latter the pipe 18 is connected. A plurality of spray nozzles 28 are fixed at their lower ends to the partition 22 and extend upward at about the same angle as the windshield A through the upper portion of the tank 20 and apertures in the cowl C. Each spray nozzle 28 is provided at its lower portion with an inlet port 30 controlled by a valve 32 fixed upon a shaft 34. All of the valves 32 are fixed for simultaneous operation to the shaft 34 which is rockably mounted in the ends of the tank 20 from which they project to receive the upper ends of a U-shaped lever 36 fixed thereon. The valves 32 are normally held in closed position by a spring 31 connected to the lever 36 and a pin 33 fixed to the tank 20.

Any suitable packing means, not shown, may be provided for sealing the ends of the tank 20 where the shaft 34 extends therethrough to prevent leakage of an antifreeze liquid placed in the compartment 24 through a filler opening 38 normally closed with a cap 40.

Arranged axially within each spray nozzle 28 is an air nozzle 42 fixed at its lower end to the partition 22 which has ports 44 communicating with the respective air nozzles. A hand actuated rod 46 extends loosely through slots in the free ends of the levers 13 and 36 and also through a slot 48 in the automobile dash G and is provided at its rear end with a knob 50 within convenient reach of the driver.

The forward portion of the rod 46 extends loosely through a guide 52 and is provided with relatively weak and strong coil springs 54 and 56, respectively, which tend to hold the valve 12 in position to shut off the hot air from the stove 2 to blower 6. The spring 56 is interposed between the lever 13 and a nut and washer 58 threaded upon the forward end of the rod 46, which latter is provided in advance of the lever 36 with a fixed collar 60 and at the rear of the lever 36 with fixed shoulders 62 and 64, respectively, either of which is adapted to engage over the lower end of the slot 48.

In practice, when hot air alone is sufficient to clear the windshield A of snow or sleet, the driver grasps the knob 50 and pulls the rod 46 backward until the shoulder 62 engages over the lower end of the slot 48. This operation compresses the springs 54 and 56, which latter being the stronger will move the lever 13 rearwardly and thus cause the valve 12 to close the intake 10 and open communication through pipe 4 from the stove 2 to the blower 6 which discharges the hot air against the windshield through the pipe 18, the air compartment 26, and the nozzles 42 and 28, respectively. However, should it be found that the snow and sleet has become frozen upon the windshield so that some time would be required to remove it with the hot air alone, the antifreeze liquid is also sprayed upon the windshield. This is accomplished by pulling the rod 46 backward until the shoulder 64 engages over the lower end of the slot 48, which operation causes the collar 60 to operate the lever 36 and thus open the valves 32 so that the antifreeze liquid in the compartment 24 will be syphoned therefrom and sprayed upon the windshield by the air discharged through the nozzles 42 and 28, respectively. As the antifreeze liquid is heated by the hot air discharged from the nozzles 42 its efficiency of course will be increased. In addition to the liquid having antifreezing properties, it may also be treated with a solution to impart rain shedding qualities thereto to provide clear vision for the driver when it is raining.

When both of the shoulders 62, 64 are disengaged from the lower end of the slot 48 the springs 54, 56 will expand and force the rod 46 forward and cause the valve 12 to open the cold air intake 10.

From the foregoing it will be understood that I have provided an apparatus which is well adapted for the purpose intended, and while I have shown and described a preferred embodiment of the invention I reserve all rights to such other forms and modifications thereof as properly fall within the spirit and scope of the invention as claimed.

Having thus described my invention, what I claim and desire to secure by Letters Patent, is:

1. In means for blowing air and spraying a liquid against the windshield of a motor vehicle comprising a stove associated with the engine of the motor vehicle, a blower operated by the engine, a pipe leading from said stove to the intake of the blower, a tank adjacent to the windshield divided into an air compartment and a liquid compartment, a pipe leading from the blower to said air compartment, a plurality of spray nozzles projecting from the liquid compartment and directed towards the windshield, ports establishing communication between said spray nozzles and the liquid compartment, means for controlling said ports, and nozzles communicating with the air compartment and extending into said spray nozzles.

2. In means for blowing air and spraying a liquid against the windshield of a motor vehicle comprising a stove associated with the engine of the motor vehicle, a blower operated by the engine, a pipe leading from said stove to the intake of the blower, a coupling connected to said pipe and provided with a cold-air intake, a valve in said coupling adapted to move to one position to close the cold-air intake or move to another position to close communication between the stove and the blower and open the cold air intake, a tank adjacent to the windshield divided into an air compartment and a liquid compartment, a pipe leading from the blower to said air compartment, a plurality of spray nozzles projecting from the liquid compartment and directed towards the windshield, ports establishing communication between said spray nozzles and the liquid compartment, valves for controlling said ports, a hand controlled rod for moving the first-mentioned valve to the position for opening communication between the stove and the blower, means on the rod for opening the valves controlling the ports on further movement of the rod, and nozzles communicating with the air compartment and extending into the spray nozzles.

3. In means for blowing air and spraying a liquid against the windshield of a motor vehicle comprising a stove associated with the engine of the motor vehicle, a blower operated by the engine, a pipe leading from said stove to the intake of the blower, a coupling connected to said pipe and provided with a cold-air intake, a valve in said coupling adapted to move to one position to close the cold-air intake or move to another position to close communication between the stove and the blower and open the cold air intake, a tank adjacent to the windshield divided into an air compartment and a liqiud compartment, a pipe leading from the blower to said air compartment, a plurality of spray nozzles projecting from the liquid compartment and directed towards the windshield, ports establishing communication between said spray nozzles and the liquid compartment, valves for controlling said ports, a hand controlled rod for moving the first-mentioned valve to the position for opening communication between the stove and the blower, means on the rod for opening the valves controlling the ports on further movement of the rod, means for holding the rod in each position, spring means for moving the rod in position to move the first-mentioned valve in position to close the cold air intake, spring means for closing the port controlling valves, and nozzles communicating with the air compartment and extending into the spray nozzles.

HERBERT GALE.